United States Patent
Clinton et al.

(10) Patent No.: US 8,854,930 B1
(45) Date of Patent: Oct. 7, 2014

(54) SLIDER EMBEDDED PHOTODETECTOR FOR OPTICAL POWER MONITORING IN HEAT ASSISTED MAGNETIC RECORDING

(71) Applicant: HGST Netherlands B.V., Amsterdam (NL)

(72) Inventors: Thomas William Clinton, Danville, CA (US); Takuya Matsumoto, Sunnyvale, CA (US); Shen Ren, Union City, CA (US); Erhard Schreck, San Jose, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/958,372

(22) Filed: Aug. 2, 2013

(51) Int. Cl.
| | |
|---|---|
| *G11B 11/00* | (2006.01) |
| *G11B 5/02* | (2006.01) |
| *G11B 5/127* | (2006.01) |
| *G11B 13/04* | (2006.01) |
| *G11B 7/1263* | (2012.01) |
| *G11B 5/48* | (2006.01) |

(52) U.S. Cl.
CPC ............ *G11B 7/1263* (2013.01); *G11B 13/045* (2013.01); *G11B 5/4866* (2013.01)
USPC ... 369/13.32; 369/13.26; 360/59; 360/125.32

(58) Field of Classification Search
None
See application file for complete search history.

(56) References Cited

U.S. PATENT DOCUMENTS

| | | | |
|---|---|---|---|
| 4,987,505 | A | 1/1991 | Iwabuchi et al. |
| 6,272,097 | B1 | 8/2001 | Nakao et al. |
| 2,744,708 | A1 | 7/2004 | Shinohara et al. |
| 6,809,908 | B1 * | 10/2004 | Ito et al. ...................... 369/13.17 |
| 8,170,389 | B1 * | 5/2012 | Komura et al. .......... 369/112.27 |
| 8,238,202 | B2 | 8/2012 | Schreck et al. |
| 8,279,721 | B2 | 10/2012 | Aikoh et al. |
| 8,305,710 | B2 * | 11/2012 | Cho et al. ................. 360/125.31 |
| 8,325,566 | B2 | 12/2012 | Shimazawa et al. |
| 8,341,825 | B2 | 1/2013 | Hara et al. |
| 8,369,192 | B1 * | 2/2013 | Komura et al. ............ 369/13.33 |
| 2007/0159718 | A1 * | 7/2007 | Kim et al. ....................... 360/59 |
| 2010/0007980 | A1 | 1/2010 | Kim et al. |
| 2012/0176874 | A1 | 7/2012 | Komura et al. |
| 2013/0135975 | A1 | 5/2013 | Gage et al. |

OTHER PUBLICATIONS

Black, Eric J., "Optical path integration in heat assisted magnetic recording," Thesis submitted in partial fulfillment of the requirements for the degree of Doctor in Philosophy in Electrical and Computer Engineering, Carnegie Mellon University, Pittsburgh, PA, Aug. 2010: 1-176.

* cited by examiner

*Primary Examiner* — Thang Tran
(74) *Attorney, Agent, or Firm* — Billion & Armitage

(57) ABSTRACT

Techniques for improving the recording quality during heat assisted magnetic recording (HAMR) by monitoring the power of a source used to heat a storage medium are described. In one example, a source emits electromagnetic radiation. A waveguide transmits the electromagnetic radiation onto a surface of a magnetic media. A photoresistive material is proximately located to the waveguide. The resistance of the photoresistive material varies based on the intensity of electromagnetic radiation propagating through the waveguide. The power of the source is determined by measuring the resistance of the photoresitive material. The power of the source is adjusted based on the determined power.

20 Claims, 9 Drawing Sheets

SLIDER EMBEDDED PHOTODETECTOR FOR OPTICAL POWER MONITORING IN HEAT ASSISTED MAGNETIC RECORDING

TECHNICAL FIELD

This disclosure relates to data storage devices, and more particularly to techniques for heat assisted magnetic recording.

BACKGROUND

Data storage devices can be incorporated into a wide range of devices, including large scale data centers, laptop or desktop computers, tablet computers, digital video recorders, set-top boxes, digital recording devices, digital media players, video gaming devices, video game consoles, cellular telephones, and the like. Data storage devices may include hard disk drives (HDD). HDDs include one or multiple magnetic disks having positive or negative areas of magnetization. A bit of data may be represented according to a defined area of magnetization, which may be referred to as a bit cell or magnetic element. Blocks of data are arranged to form tracks on a rotating disk surface. A magnetic transducer may be used to read data from the disk. Different magnetic recording techniques may be used to store data to the disk. Magnetic recording techniques include, for example, longitudinal magnetic recording (LMR), perpendicular magnetic recording (PMR), and shingled magnetic recording (SMR). Heat assisted magnetic recording (HAMR) may be used with LMR, PMR, or SMR.

To increase the areal density of a disk the size of magnetic elements may be reduced. However, smaller magnetic elements may be thermally unstable (i.e., erased due to ambient temperature fluctuations). In order to have smaller magnetic elements that maintain their state at room temperature, the smaller magnetic elements can be composed of high coercity material. However, it may be difficult to write data to high coercive materials at room temperature using the magnetic field produced by a conventional recording head. HAMR is a magnetic recording technique that allows data to be written to a magnetic disk composed of small high coercive magnetic elements by increasing the temperature of a magnetic element during recording. Thus, HAMR may allow for higher areal densities than conventional LMR, PMR and SMR. HAMR may also be referred to as thermally assisted (magnetic) recording (TAR or TAMR), or energy assisted magnetic recording (EAMR).

SUMMARY

In general, this disclosure describes techniques for storing data. In particular, this disclosure describes techniques for improving recording during HAMR by monitoring the power of a source used to heat a storage medium.

According to one example of the disclosure, a heat assisted magnetic recording slider of a disk drive, comprises a transducer configured to emit electromagnetic radiation, a waveguide configured to transmit the electromagnetic radiation onto a surface of a magnetic media, and a layer of photoresistive material proximately located to the waveguide such that the resistance of the layer of photoresistive material is proportional to the intensity of electromagnetic radiation propagating through the waveguide.

According to another example of the disclosure, a method of monitoring electromagnetic intensity in a heat assisted magnetic recording slider, comprises emitting electromagnetic radiation, transmitting the electromagnetic radiation through a waveguide onto a surface of a magnetic media, measuring the resistance of a layer of photoresistive material proximately located to the waveguide, and determining the intensity of electromagnetic radiation propagating through the waveguide based on the measured resistance.

According to another example of the disclosure an apparatus configured to store data using heat assisted magnetic recording comprises means for emitting electromagnetic radiation, means for transmitting the electromagnetic radiation onto a surface of a magnetic media, means for measuring the resistance of a layer of photoresistive material proximately located to the means for transmitting, and means determining the intensity of electromagnetic radiation propagating through the means for transmitting based on the measured resistance.

The details of one or more examples are set forth in the accompanying drawings and the description below. Other features, objects, and advantages will be apparent from the description and drawings, and from the claims.

DETAILED DESCRIPTION

A HAMR recording head within a slider may use laser beams and/or near-field optical sources to heat a storage medium during recording. The optical power in the light delivery path of HAMR heads affects the heating temperature profile of the media, and hence the recording quality during HAMR recording. Monitoring and actively controlling the optical power can greatly improve HAMR recording quality, reliability, and head lifetime.

Some techniques that may be used for optical power monitoring include fabricating additional optical waveguides in the head structure and using the additional optical waveguides to transmit optical power to a stand-alone photodetector (i.e., a diode). Stand-alone photodetectors may be mounted in a head gimbal assembly (HGA). However, additional optical waveguide circuitry may complicate head fabrication. Further, stand-alone photodetectors add additional cost to the overall cost of the HAMR head. This disclosure describes techniques for integrating a thin-film based photodetector inside a HAMR slider in close proximity to the HAMR electromagnetic radiation delivery path. A HAMR slider including an integrated thin film photodetector may have several advantages compared to a stand-alone photodetector mounted in a HGA, including, for example, lower costs, faster response time, and more accurate optical power monitoring.

Figure 1:
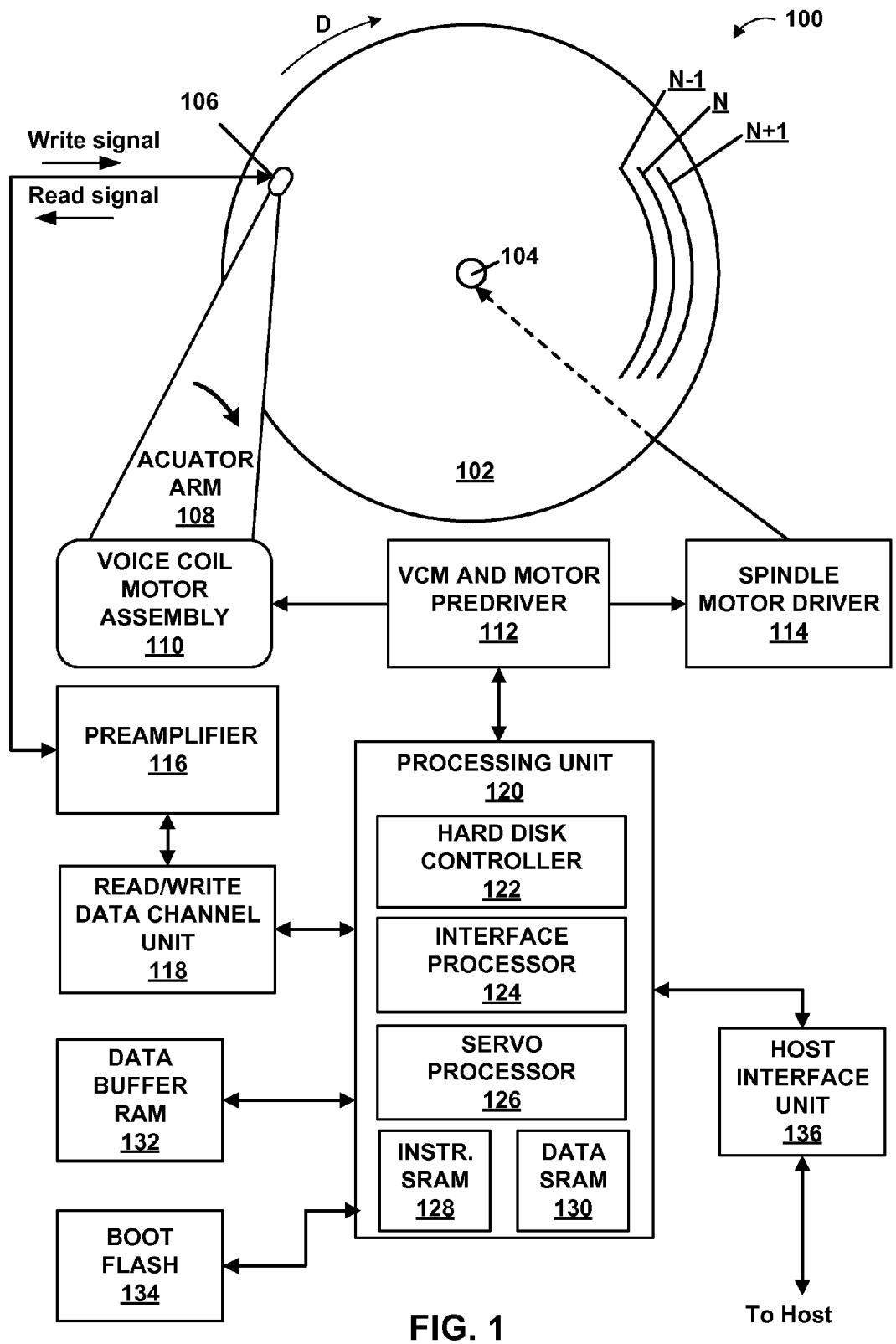
FIG. 1 is a conceptual diagram illustrating an example hard disk drive that may utilize the techniques described in this disclosure.

FIG. 1 is a conceptual diagram illustrating an example hard disk drive that may utilize the techniques described in this disclosure. Disk drive 100 may be operably coupled to a host device as an internal or external data storage device. A host device may include, for example, a laptop or desktop computer or a similar device. Disk drive 100, includes data recording disk or medium 102, spindle assembly 104, slider 106, actuator arm 108, voice coil motor assembly 110, VCM and motor predriver 112, spindle motor driver 114, preamplifier 116, read/write data channel unit 118, processing unit 120, data buffer RAM 132, boot flash 134, and host interface unit 136. Processing unit 120 includes hard disk controller 122, interface processor 124, servo processor 126, instruction SRAM 128, and data SRAM 130. It should be noted that although example hard disk drive 100 is illustrated as having distinct functional blocks, such an illustration is for descriptive purposes and does not limit hard disk drive 100 to particular hardware architecture. In a similar manner, processing unit 120 should not be limited to a particular hardware architecture based on the example illustrated in FIG. 1. Functions of hard disk drive 100 may be realized using any combination of hardware, firmware, and/or software implementations.

Disk 102 includes a stack of one or more disks having magnetic material deposited on one or both sides thereof. Disk 102 may be composed of a light aluminum alloy, ceramic/glass, or other suitable substrate that magnetic material may be deposited thereon. Using electromagnetic techniques, data may be stored on disk 102 by orientating an area of the magnetic material. Data stored on disk may be organized as data blocks. Data blocks are typically 512 bytes or 4 KB in size, but may be other sizes. The data written to disk 102 may be arranged into a set of radially-spaced concentric tracks, illustrated in FIG. 1 as N−1, N, and N+1. A data block may be located within a sector of a particular track.

Magnetic material of disk 102 may be configured according to a plurality magnetic recording techniques. Examples of magnetic recording techniques include longitudinal magnetic recording (LMR) and perpendicular magnetic recording (PMR). Additional magnetic recording techniques include shingled magnetic recording (SMR) and heat assisted magnetic recording (HAMR). SMR is a type of PMR where tracks are written in a partially overlapping manner. As described above, HAMR may be used in conjunction with LMR, PMR, or SMR techniques to achieve higher areal storage density.

As illustrated in FIG. 1, disk 102 is coupled to spindle assembly 104 and rotates in direction D about a fixed axis of rotation. Disk 102 may be rotated at a constant or varying rate. Typical rates of rotation range from less than 3,600 to more than 15,000 revolutions per minute. However, disk 102 may be rotated at higher or lower rates and the rate of rotation may be determined based on a magnetic recording technique. Spindle assembly 104 includes a spindle and a motor and is coupled to spindle motor driver 114. Spindle motor driver 114 provides an electrical signal to spindle assembly 104 and the rate at which the spindle rotates, and thereby disk 102, may be proportional to the voltage or current of the electrical signal. Spindle motor driver 114 is coupled to VCM and motor predriver 112. VCM and motor predriver 112 may be configured to use feedback techniques to insure disk 102 rotates at a desired rate. For example, VCM and motor predriver 112 may be configured to receive current and/or voltage signals from the motor and adjust the electrical signal provided to spindle motor driver 114 using feedback circuits.

As illustrated in FIG. 1, VCM and motor predriver 112 is also coupled to voice coil motor assembly 110. In addition to providing an electrical signal to spindle motor driver 114, VCM and motor predriver 112 is also configured to provide an electrical signal to voice coil motor assembly 110. Voice coil motor assembly 110 is operably coupled to actuator arm 108 such that actuator arm 108 pivots based on the current or voltage of the electrical signal received from VCM and motor predriver 112. As illustrated in FIG. 1, slider 106 is coupled to actuator arm 108. Thus, VCM and motor predriver 112 adjusts the position of slider 106 with respect to disk 102. VCM and motor predriver 112 may use feedback techniques to insure slider 106 maintains a desired position with respect to disk 102. In one example, VCM and motor predriver 112 includes an analog-to-digital converter to monitor electromagnetic fields and current from voice coil motor assembly 110.

Slider 106 is configured to read and write data to disk 102 according to a magnetic recording technique, for example, any of the example magnetic recording techniques described above. Slider 106 may include read and write heads corresponding to each of a plurality of disks included as part of disk 102. Further, slider 106 may include one or more read and write heads for each disk. Slider 106 is coupled to preamplifier 116. Preamplifier 116 may also be referred to as arm electronics (AE). Preamplifier 116 is configured to select a correct head from a plurality of heads for a particular read or write operation. Preamplifier 116 is configured to drive head 106 with a write current, during a write operation. Further, preamplifier 116 is configured to amplify read signals from slider 106, during a read operation using a programmable head bias current. Preamplifier 116 may also be configured to detect errors during each of the read and write operations. Preamplifier 116 may also include a signal adaptive filter (SAF) for thermal asperity (TA) recovery during a read operation.

Preamplifier 116 receives data to be written to disk 102 from read/write data channel unit 118. Preamplifier 116 provides data read from disk 102 to read/write data channel unit 118. Data may originate from a host device and may be communicated to read/write data channel unit 118 via host interface unit 136 and processing unit 120. Host interface unit 136 provides a connection between hard disk drive 100 and a host device. Host interface unit 136 may operate according to a physical and logical characteristics defined according to a computer bus interface. Example standardized interfaces include ATA (IDE, EIDE, ATAPI, UltraDMA, SATA), SCSI (Parallel SCSI, SAS), Fibre Channel, and PCIe (with SOP or NVMe).

As illustrated in FIG. 1, processing unit 120 includes hard disk controller 122, interface processor 124, servo processor 126, instruction SRAM 128, and data SRAM 130. Instruction SRAM 128 may store a set of operation instructions for processing unit 120. Instructions may be loaded to instruction SRAM 128 from boot flash 134 when hard disk drive 100 is powered on. Data SRAM 130 and data buffer RAM 132, which is coupled to processing unit 120 are configured to buffer blocks of data during read and write operations. For example, blocks of data received from host interface unit 136 may be sequentially stored to data SRAM 130 and data buffer RAM 132 before the data blocks are written to disk 102. It should be noted that although instruction SRAM 128, data SRAM 130, data buffer RAM 132, and boot flash 134 are illustrated as distinct memory units, the functions of instruction SRAM 128, data SRAM 130, data buffer RAM 132, and boot flash 134 may be implemented according to other types of memory architectures.

Hard disk controller 122 generally represents the portion of processing unit 120 configured to manage the transfer of blocks of data to and from host interface unit 136 and read/write data channel unit 118. Hard disk controller 122 may be configured to perform operations to manage data buffering and may interface with host interface unit 136 according to a defined computer bus protocol, as described above. For example, hard disk controller 122 may receive and parse packets of data from host interface unit 136. Further, hard disk controller 122 may be configured to communicate with host. For example, hard disk controller 122 may be configured to report errors to host and format disk 102 based on commands received from host.

Interface processor 124 generally represents the portion of processing unit 120 configured to interface between servo processor 126 and hard disk controller 122. Interface processor 122 may perform predictive failure analysis (PFA) algorithms, data recovery procedures, report and log errors, perform rotational positioning ordering (RPO) and perform command queuing. In one example, interface processor may be an ARM processor.

As described above, data is typically written to or read from disk 102 in blocks which are contained within a sector of a particular track. Disk 102 may also include one or more servo sectors within tracks. Servo sectors may be circumferentially or angularly-spaced and may be used to generate servo signals. A servo signal is signal read from disk 102 that may be used to align slider 106 with a particular sector or track of disk 102. Servo processor 126 generally represents the portion of processing unit 120 configured to control the operation of spindle assembly 104 and voice coil motor assembly 110 to insure slider 106 is properly positioned with respect to disk 102. Servo processor 126 may be referred to as a Servo Hardware Assist Real-time Processor (SHARP). Servo processor 126 may be configured to provide closed loop control for all combinations of: slider position on track, slider seeking, slider settling, spindle start, and spindle speed. Further, servo processor 126 may include a set of instructions to calculate servo related variables. Servo related variables may be further used to align slider 106 with a track of disk 102.

Figure 2:
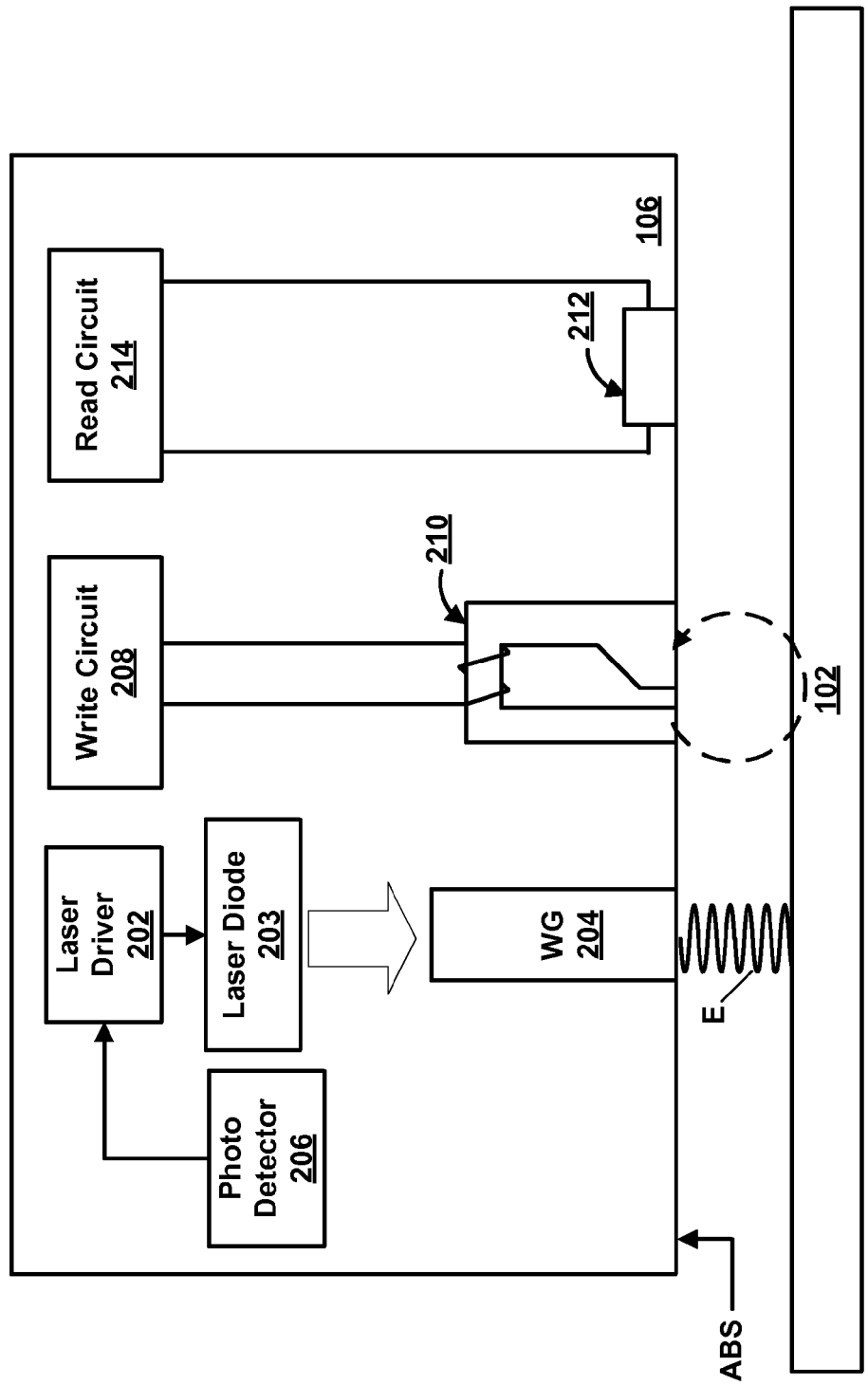
FIG. 2 is a conceptual diagram illustrating an example slider that may utilize techniques described in this disclosure.

FIG. 2 is a conceptual diagram illustrating an example slider that may utilize techniques described in this disclosure. It should be noted that for ease of description, components illustrated in FIG. 2 are not to scale and the relative position of elements as illustrated in FIG. 2 may not necessarily reflect the actual position of the elements in a constructed slider. FIGS. 3, 5, 6, and 7, described in detail below, provide additional details regarding how a slider 106 configured to utilize techniques described herein may be constructed. Slider 106 is an example of a slider that records data to disk 102 using HAMR. Slider 106 may be fabricated using a composite material, such as, for example, a composite of alumina/titanium-carbide ($Al_2O/TiC$). As illustrated in FIG. 2, slider 106 includes laser driver 202, laser diode 203, waveguide 204, photodetector 206, write circuit 208, write transducer 210, read transducer 212, and read circuit 214.

The surface of slider 106 that is adjacent to disk 102 is referred to as the Air Bearing Surface (ABS). As described above, HAMR is a magnetic recording technique that allows data to be written to a magnetic disk including high anisotropy magnetic elements by increasing the temperature of a magnetic element during recording. As illustrated in FIG. 2, electromagnetic energy E is emitted from slider 106 through the ABS onto the surface of disk 102, thereby heating the surface of disk 102. The surface of disk 102 may be composed of high anisotropy magnetic elements including for example, a cobalt-chromium (CoCr) alloy granular layer grown on a special growth-enhancing sublayer, or a multilayer of alternating films of Co with films of platinum (Pt) or palladium (Pd). The surface of disk 102 may also include $L1_0$ ordered alloy, such as FePt or FeNiPt.

As described above, disk 102 may include a plurality of adjacent and in some instances partially overlapping data tracks (e.g., SMR tracks). Waveguide 204 is configured to focus electromagnetic energy E onto a specific track where data is to be written in a manner that minimizes the heating of adjacent tracks. In the example illustrated in FIG. 2, waveguide 204 receives electromagnetic radiation from laser diode 203 and includes an optical waveguide and a near field transducer. However, it should be noted that in other examples, laser diode 203 may be any type of electromagnetic radiation source and waveguide 204 may be configured to focus the electromagnetic radiation emitted by the source to a particular data area of disk 102. In some examples, laser diode 203 may be a InP based, GaAs based, or GaN based diode. In some examples, the wavelength of the laser light emitted from laser diode 203 may be within the range of approximately 375 nm (nanometers) to 1700 microns. For example, a laser diode 203 may be configured to emit laser light with a wavelength of approximately 800 nm.

Laser driver 202 is configured to provide power to laser diode 203. That is, laser driver 202 may provide a current to laser diode 203 and the power of laser light emitted by laser diode 203 may be proportional to the current according to operating parameters of the laser diode 203. As described above, the optical power in the light delivery path of HAMR heads affects the recording quality during HAMR recording. In some cases, laser diode 203 power variations may be due to ambient temperature variation. Further, excessive temperatures may damage and reduce the useful life of components of slider 106. For example, the quantum efficiency of laser diode 203 may decrease due to aging of the semiconductor material caused by excessive temperatures. As illustrated in FIG. 2, laser driver 202 is coupled to photodetector 206. Photodetector 206 is configured to determine the electromagnetic power delivered to the ABS through its optical absorption. Photodetector 206 provides feedback to laser driver 202 such that laser driver 202 may adjust the power of laser light emitted by laser diode 203. This feedback control permits the disk drive 100 to perform HAMR at a sufficient temperature without damaging or prematurely aging components of slider 106. In one example, when a power change is measured from the photodetector 203, the current provided to laser diode 202 can be changed to compensate this power change. For example, the bias current provided to laser diode 203 from laser driver 202 can be increased to compensate for a power change.

Write transducer 210 is configured to produce a magnetic flux in response to a current received from write circuit 208. Write circuit 208 may be coupled to preamplifier 116. As illustrated in FIG. 2, a coil extending from write circuit 208 is wrapped around write transducer 210. Write transducer 210 includes a write pole formed of conventional high-moment material, such as a NiFe or FeCoNi. When write-current pulses are directed from write circuit 208 through the coil the write transducer 210 directs magnetic flux, represented by arrow, to disk 102. The magnetic flux causes data to be recorded to disk 102. Write circuit 208 works in conjunction with laser driver 202 such that magnetic flux is directed at disk 102 when disk has been heated to a desired temperature for HAMR recording.

Read transducer 212 includes a magnetoresistive read sensor configured to detect a magnetic field from disk 102. The magnetoresistive read sensor may be, for example, a tunneling magneto resistive (TMR) sensor, a current-in-plane giant magnetoresistive (CIP-GMR) sensor, or a current-perpendicular-to-plane giant magnetoresistive (CPP-GMR) sensor. Read circuit 214 is configured to reproduce data from the read transducer 212 and may include an amplifier and a demodulator. Read circuit 214 may be coupled to preamplifier 116. In some examples, preamplifier 116 may perform amplification and demodulation. In this manner, slider 106 represents an example of a slider configured to record data to disk 102 using HAMR and retrieve recorded data from disk 102. FIGS. 3, 5, 6, and 7, described in detail below, provide additional detail regarding how example slider 106 may be constructed. In particular, each of FIGS. 3, 5, 6, and 7 illustrate example implementations of photodetector 206.

Figure 3:
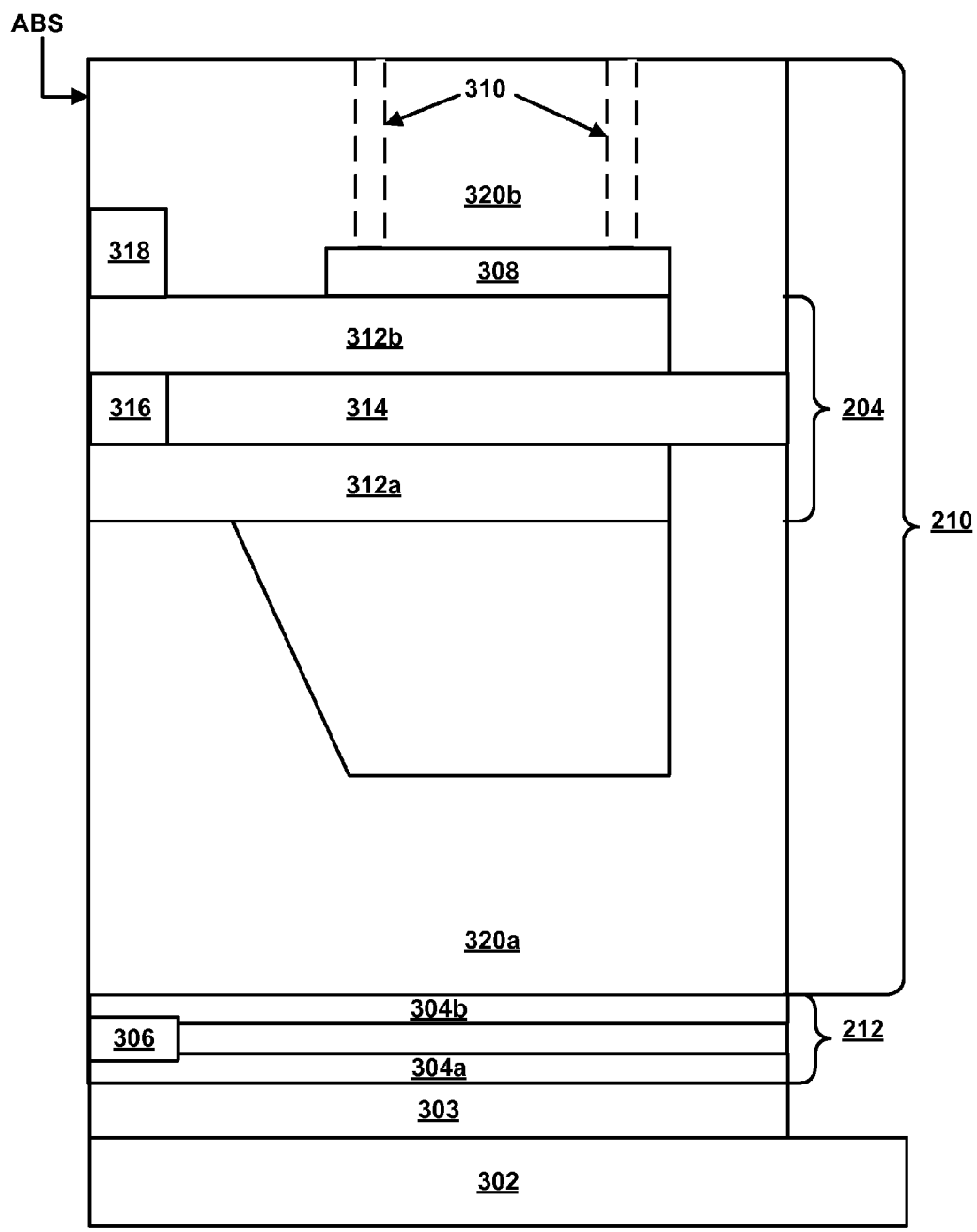
FIG. 3 is a conceptual diagram illustrating a cross-sectional view of an example slider that may utilize techniques described in this disclosure.

FIG. 3 is a conceptual diagram illustrating a cross-sectional view of an example slider that may utilize techniques described in this disclosure. As illustrated in FIG. 3, read transducer 212, write transducer 210, and waveguide 204 are formed as a series of layers on substrate 302. Substrate 302 may be any suitable substrate material for slider construction, such as, for example, alumina/titanium-carbide ($Al_2O$/TiC). Slider 106 may include an insulating layer 303 between substrate 302 and read transducer 212. Insulating layer 303 may be composed of insulating material, such as, for example, $Al_2O_3$ or $SiO_2$.

In the example illustrated in FIG. 3, read transducer 212 includes shields 304a and 304b and magnetoresistive read sensor 306. As described above, a magnetoresistive read sensor is configured to detect a magnetic field from disk 102. Thus, magnetoresistive read sensor 306 may be any of the magnetoresistive read sensors described above. Shields 304a and 304b are configured to prevent magnetoresistive read sensor 306 from receiving external magnetic fields as noise. Shields 304a and 304b are constructed out of materials based on the type of magnetoresistive read sensor 306. For example, shields 304a and 304b may be magnetic layers formed of a soft-magnetic material such as NiFe, FeSiAl, CoFeNi, CoFe, FeN, FeZrN or CoZrTaCr, or the multilayer of at least two of these materials.

As illustrated in FIG. 3, write transducer 210 includes lower magnetic yolk 320a, upper magnetic yolk 320b, and magnetic pole 318. Waveguide 204 is substantially integrated into write transducer 210 and includes cladding 312a and 312b, core 314, and near-field transducer 316. As described above, write transducer 210 is configured to produce a magnetic flux in response to a current. Magnetic pole 318 is an example of a write pole and may be formed of conventional high-moment material, such as a NiFe or FeCoNi. Lower magnetic yolk 320a and upper magnetic yolk 320b are configured such that magnetic pole 318 directs a magnetic flux onto disk 102 in response to current in a coil (not shown) wrapped around lower magnetic yolk 320a and upper magnetic yolk 320b. Further, lower magnetic yolk 320a and upper magnetic yolk 320b provide a return path for the magnetic flux. In the example illustrated in FIG. 3, lower magnetic yolk 320a acts as a return pole.

As described above, waveguide 204 is configured to focus electromagnetic energy E (e.g., laser light) onto disk 102. Core 314 may be composed a high-index-of-refraction dielectric material that is transmissive to radiation of a particular wavelength emitted by laser diode 203. For example, core 314 may be composed of radiation-transmissive materials such as $TiO_2$ and/or $Ta_2O_5$. Cladding 312a and 312b are composed of materials with a lower refractive index than the core 314. In this manner, electromagnetic radiation of a particular wavelength propagates through waveguide 204 based on the principles of optics. Cladding 312a and 312b may be composed of $SiO_2$ and/or $Al_2O_3$. In some examples, cladding 312a and/or cladding 312b may be configured to be transparent to particular frequencies of electromagnetic radiation. Near-field transducer 316 may be a plasmonic device that focuses the beamspot of the electromagnetic radiation to avoid heating neighboring tracks of disk 102. That is, near-field transducer 316 may create a beamspot smaller than the diffraction limit. The near-field transducer 316 may operate with, for example, either a c-aperature, e-antenna plasmonic near-field source, or another shaped transducer. The composition of cladding 312a and 312b, core 314, and near-field transducer 316 is based on the wavelength of electromagnetic radiation emitted by a source. In one example, emitted electromagnetic radiation may include electromagnetic radiation with a wavelength within the visible spectrum (400-700 nm). In one example, emitted electromagnetic radiation may include electromagnetic radiation with a wavelength of approximately 800 nm. In another example, emitted electromagnetic radiation may include electromagnetic radiation with a wavelength within the mid-infrared range (5-8 microns). In yet another example, emitted electromagnetic radiation may include electromagnetic radiation with a wavelength within the far-infrared range (15-1000 microns).

As describe above with respect to FIG. 2, photodetector 206 is configured to measure electromagnetic power through optical absorption. In one example, photodetector 206 measures the photocurrent, which is linearly proportional to the power inside waveguide 204. In the example illustrated in FIG. 3, photodetector 206 includes a layer of photoresistive material 308 and contact stab 310. Photoresistive material 308 is configured such that the resistance of photoresistive material 308 varies based on exposure to an increasing intensity of electromagnetic radiation. In one example, photoresistive material 308 is a thin-film semiconductor-based photoresistive material that has a resistance that decreases with exposure to an increasing intensity of light. Thus, in this example, photoresistive material 308 may be distinguished from photoresistive devices, or photoconductive devices, such as a fabricated diode, in that the photoresistive effect may be measured using a single layer of material. Photoresistive material 308 may be deposited using sputtering or other deposition techniques that are generally compatible with slider fabrication. The photoresistive material 308 may be doped p-n, or p-i-n junctions, and/or metal-semiconductor-metal (MSM) structures. Photoresistive material 308 may be annealed or re-crystallized into poly- or single crystalline form. Contact stab 310 is configured to provide electrical contacts such that the resistance of photoresistive material 308 may be measured.

As illustrated in FIG. 3, photoresistive material 308 is located adjacent to cladding 312b. As described above, cladding 312b may be configured to be transparent to particular frequencies of electromagnetic radiation. As such, photoresistive material 308 is be exposed to electromagnetic radiation propagating through core 314 and the resistance of photoresistive material 308 may increase or decrease based on the intensity of electromagnetic radiation propagating through core 314. In this manner, photoresistive material 308 is a layer of photoresistive material that is proximately located to waveguide 204 such that the resistance of the photoresistive material 308 is proportional to the intensity of electromagnetic radiation propagating through waveguide 204. In one example, measurements derived from photoresistive material 308 may be used to compensate for short-term power fluctuations. For example, measurements may be used to compensate for power fluctuations due to mode hopping which may occur in with in a millisecond. Further, in another example, photoresistive material 308 may be used as a temperature sensor by analyzing changes in resistance caused by light effects and changes in resistance caused by thermal effects. It should be noted that while photoresistive material 308 is illustrated in FIG. 3 as adjacent to cladding 312b, in some examples photoresistive material 308 may be substantially integrated with cladding 312b. For example, photoresistive material 308 may be photoresistive material that is conformally deposited on surfaces of cladding 312b.

As described above, the wavelength of electromagnetic radiation emitted by a source may vary. As such, the composition of photoresistive material 308 may be configured such that particular wavelengths of electromagnetic radiation can be detected. For example, amorphous silicon may be an ideal material candidate for detecting electromagnetic radiation with a wavelength of around 800 nm. Photoresistive material 308 may be composed of amorphous silicon when a source, such as laser diode 203, is configured to emit radiation with a wavelength of around 800 nm. Further, Cadmium Sulfide (CdS) is particularly sensitive to electromagnetic radiation within the visible spectrum. Photoresistive material 308 may be composed of CdS when a source, such as laser diode 203, is configured to emit radiation within the visible spectrum. Lead Sulfide (PbS) and Indium antimonide (InSb) are particularly sensitive to electromagnetic radiation within the mid-infrared range. Photoresistive material 308 may be composed of PbS and/or InSb when a source, such as laser diode 203, is configured to emit radiation with a wavelength within the mid-infrared range. Further, Germanium Copper alloys may be useful for detecting electromagnetic radiation with wavelengths within the far-infrared range. Photoresistive material 308 may be composed of a Germanium Copper alloy when a source, such as laser diode 203, is configured to emit radiation with a wavelength within the far-infrared range.

Figure 4:
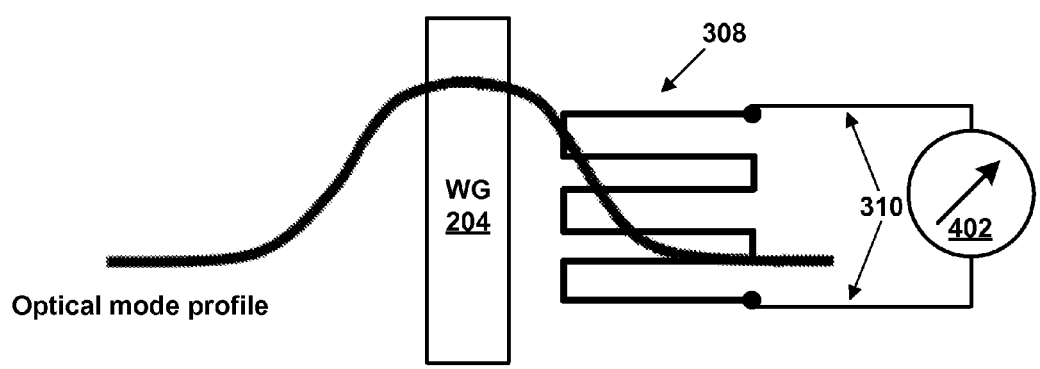
FIG. 4 is a conceptual diagram illustrating an example of photoresistive material that may utilize techniques described in this disclosure.

Photoresistive material 308 may be deposited as a full film and patterned using photolithography techniques. Further, the photoresistivity of photoresistive material 308 can be optimized by various established doping and annealing techniques. Photoresistive material 308 can be patterned in a variety of ways, depending on the application. FIG. 4 is a conceptual diagram illustrating an example of photoresistive material that may utilize techniques described in this disclosure. In the example illustrated in FIG. 4 photoresistive material 308 is a thin-film patterned as meandering lines. A meandering line pattern increases length/resistance in a given area, and, thus, the signal from photoresistive material 308. As illustrated in FIG. 4, photoresistive material 308 is coupled to a measurement device 402 using leads 310. Measurement device 402 is configured to measure the resistance of photoresistive material 308. Measurement device 402 may be any type of device configured to measure resistance.

Although FIG. 3 illustrates an example where photoresistive material 308 is located "above" waveguide 204. Photoresistive material 308 may be located anywhere in proximity to waveguide 204 such that photoresistive material 308 may detect the intensity of electromagnetic radiation propagating through waveguide 304. Photoresistive material 308 may be located above and/or below waveguide 304, or on a side of the optical waveguide. Further, photoresistive material 308 may include a plurality of distinct areas such that the distinct resistance measurements may be taken along the waveguide 204 path. One or more differential signals may be derived from the plurality of distinct areas. The distance between the photoresistive material 308 and waveguide 304 may vary depending on the power budget.

Figure 5:
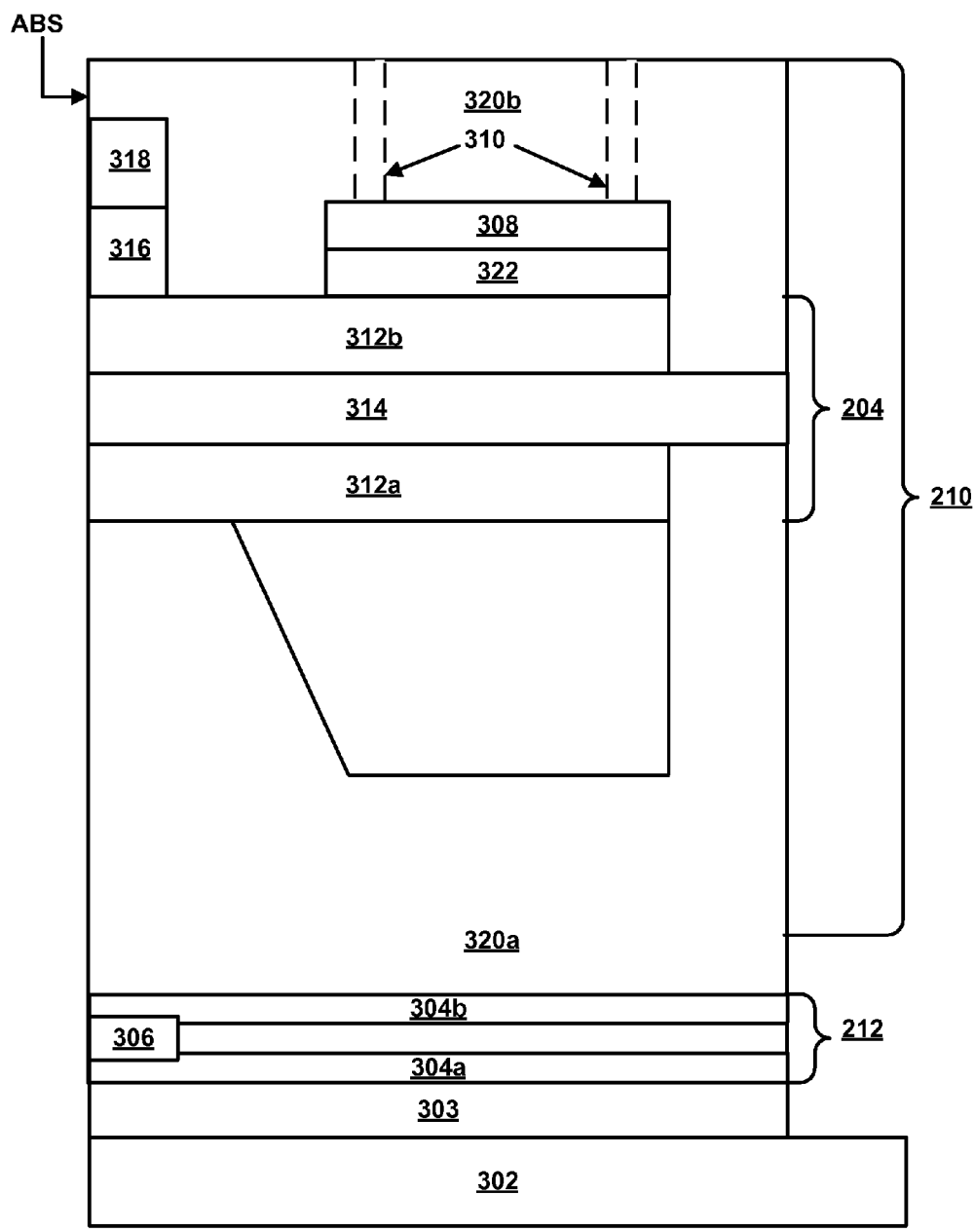
FIG. 5 is a conceptual diagram illustrating a cross-sectional view of an example slider that may utilize techniques described in this disclosure.
Figure 6:
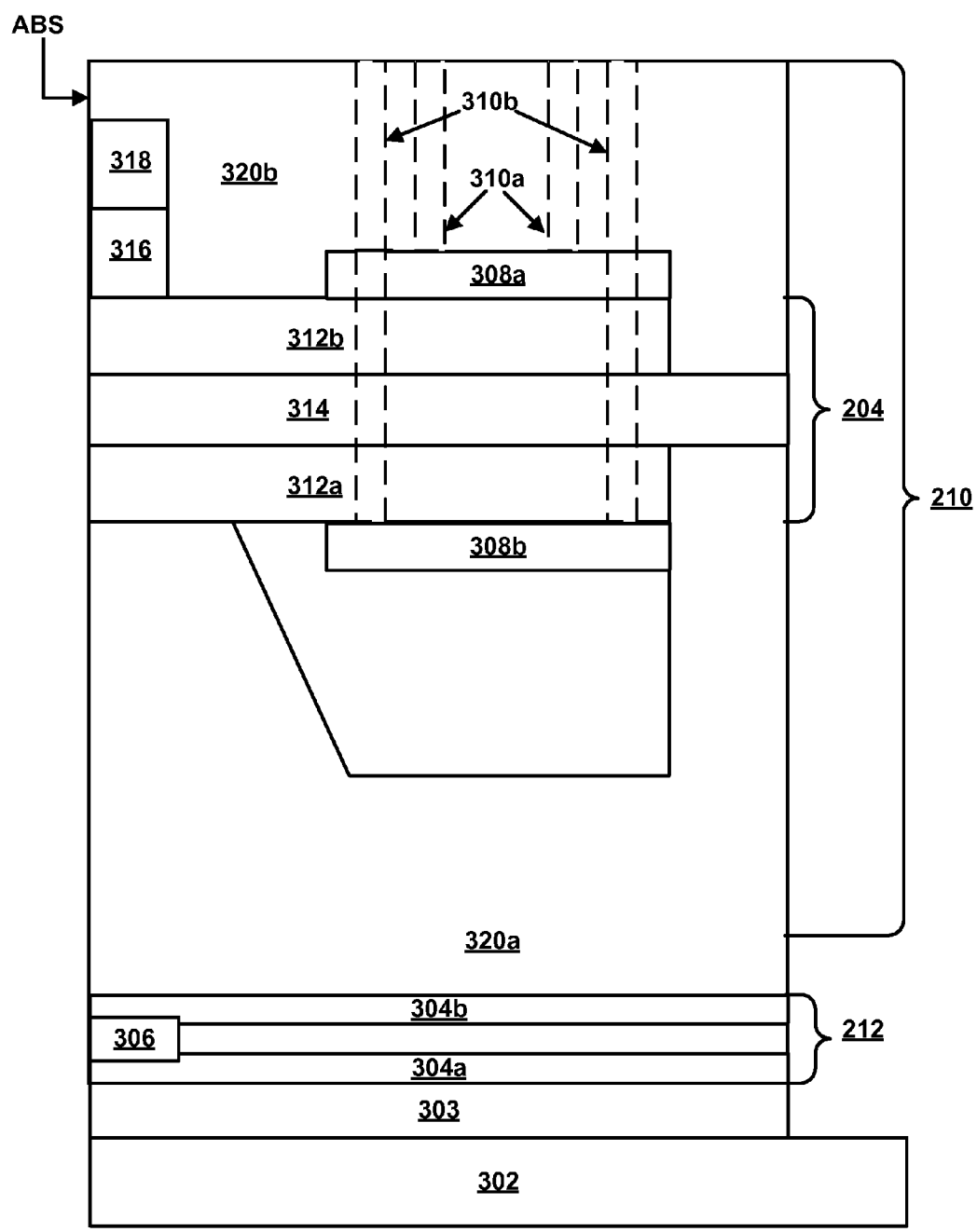
FIG. 6 is a conceptual diagram illustrating a cross-sectional view of an example slider that may utilize techniques described in this disclosure.
Figure 7:
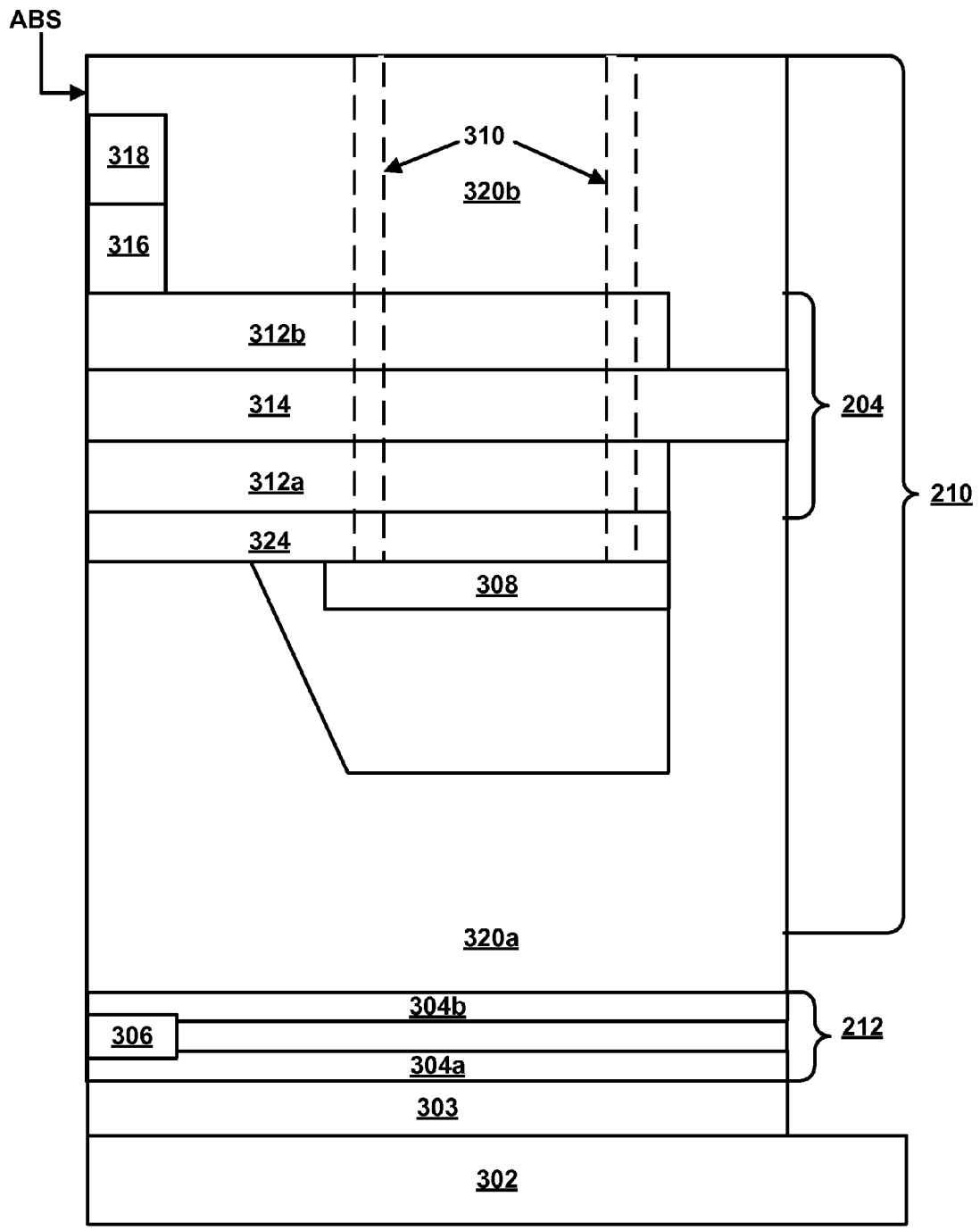
FIG. 7 is a conceptual diagram illustrating a cross-sectional view of an example slider that may utilize techniques described in this disclosure.

FIGS. 5, 6, and 7, are conceptual diagrams illustrating cross-sectional views of further example sliders that may utilize techniques described in this disclosure. In the examples illustrated FIGS. 5, 6, and 7 like numbered element are similar to elements described above with respect to FIG. 3 and for the sake of brevity a description of like number elements is not repeated. In the example illustrated in FIG. 5 photoresistive material 308 is separated from cladding 312b by material 322. Material 322 may be a transparent electrical insulating material. For example, material 322 may be a thin-film of silica.

As described above, a plurality of distinct areas of photoresistive material 308 may be located in proximity to waveguide 204. In the example illustrated in FIG. 6, photoresistive material 308a is located "above" waveguide 204 and photoresistive material 308b is located "below" waveguide 204. Although, FIG. 6 illustrates two areas photoresistive material located in proximity to waveguide 204, it should be noted that it some examples an additional plurality of areas of photoresistive material may be located in proximity to waveguide 204. For example, it is possible to fabricate an area of photoresistive material on each of the four sides of waveguide 204. Photoresistive materials 308a and 308b may be composed of any and all combinations of the photoresistive materials describe above. Each of photoresistive materials 308a and 308b are coupled respective contact stabs 310a and 310b. In this manner, two independent resistance measurements may be taken. A differential signal may be derived from the resistance measurements. In addition to being used to determine the power of electromagnetic radiation emitted from a source, such as laser diode 203, in one example, a differential signal may be used for alignment of laser diode 203 and waveguide 204. For example, in the example where laser diode 203 is distinct from slider 116, a differential signal may be used to position laser diode 203 with respect to slider 116 during the assembly of HDD 100.

In the example illustrated in FIG. 7 slider includes a secondary waveguide 324. Secondary waveguide 324 may be composed of similar materials to that of waveguide 204 and may be configured such that stray electromagnetic radiation (e.g., electromagnetic radiation reflected from disk 102) may be directed for measurement. In some cases, changes in stray electromagnetic radiation may indicate optical changes/degradation at the ABS. Although secondary waveguide 324 is illustrated in FIG. 7 as being adjacent to the ABS, in some examples secondary waveguide 234 may be located in proximity to laser diode 203 such that electromagnetic radiation that does not propagate through waveguide 204 may be monitored. In the example illustrated in FIG. 7 photoresistive material 308 directly clads secondary waveguide 324. It should be noted that in other examples photoresistive material 308 may be located in proximity to waveguide 204 as described above. Although FIGS. 3, 5, 6, and 7 are described as distinct examples, the examples illustrated in each of FIGS. 3, 5, 6, and 7 may be readily combined. For example, a slider may include photoresistive material located in proximity to a primary waveguide (e.g., primary waveguide 204) and photoresistive material located in proximity to a secondary waveguide (e.g., waveguide 324), where a primary waveguide 204 is configured to focus electromagnetic energy E onto a specific area of a disk and a secondary waveguide is configured to direct scattered electromagnetic radiation. For the sake of brevity each and every combination of the examples illustrated in FIGS. 3, 5, 6, and 7 are not illustrated and described herein.

Figure 8:
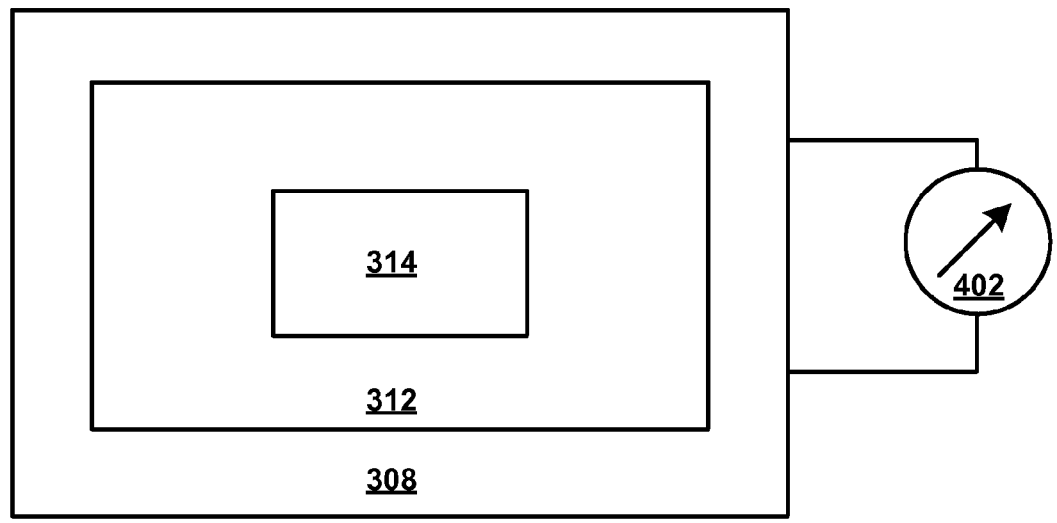
FIG. 8 is a conceptual diagram illustrating a cross-sectional view of a primary waveguide that may utilize techniques described in this disclosure.
Figure 9:
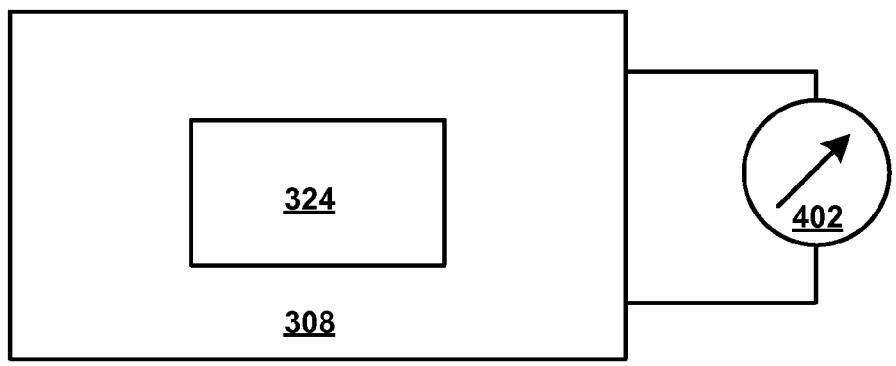
FIG. 9 is a conceptual diagram illustrating a cross-sectional view of a secondary waveguide that may utilize techniques described in this disclosure.

FIG. 8 is a conceptual diagram illustrating a cross-sectional view of a primary waveguide that may utilize techniques described in this disclosure. FIG. 9 is a conceptual diagram illustrating a cross-sectional view of a secondary waveguide that may utilize techniques described in this disclosure. FIGS. 8 and 9 illustrate that while core 314, cladding 312, secondary waveguide 324, and photorestive material 308 are illustrated in FIGS. 3, 5, 6, and 7 as layers, each of core 314, cladding 312, secondary waveguide 324, and photorestive material 308 may form a three dimensional shape and photoresistive material 308 may surround a waveguide on multiple sides.

Figure 10:
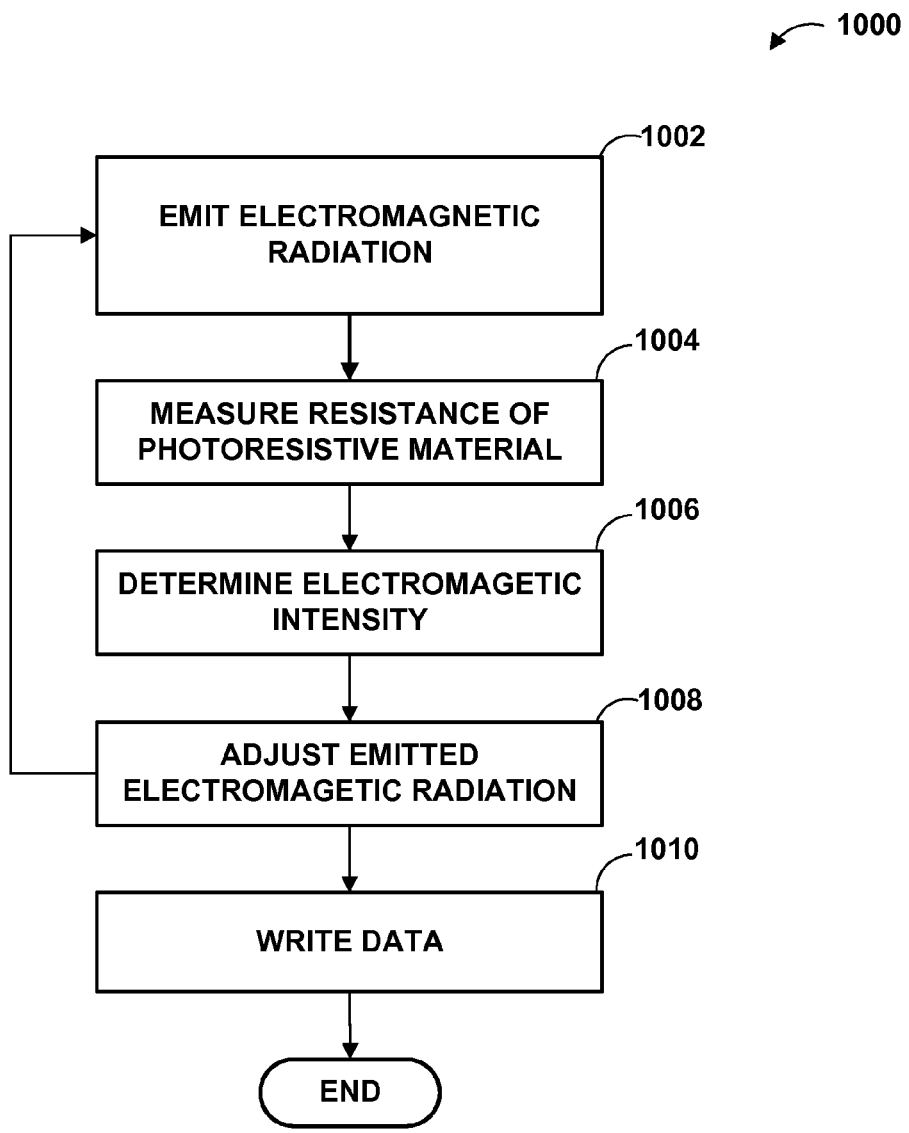
FIG. 10 is a flowchart illustrating an example technique for monitoring electromagnetic power.

FIG. 10 is a flowchart illustrating an example technique 1000 for monitoring electromagnetic power. A source, such as laser diode 203 described above, emits electromagnetic radiation (1002). Electromagnetic radiation may include electromagnetic radiation having any of the wavelengths described above. A measurement device, such as measurement device 402 described above, measures the resistance of a photoresistive material (1004). Photoresistive material may be a layer proximately located to a waveguide, as described above. Photoresistive material may include any of the example photoresistive materials described above. One or more components of HDD 100, such as preamplifier 116, may receive a measured resistance value and determine the electromagnetic intensity of emitted electromagnetic radiation (1006). HDD 100 may be configured to determine the electromagnetic radiation based on known characteristics of the photoresistive material. The emitted electromagnetic radiation may be adjusted based on the determined electromagnetic intensity (1008). In this manner, real-time feedback (e.g., in the millisecond range) may be used to adjust the power level of an electromagnetic radiation source. For example, current output by laser driver 202 may be adjusted. Write transducer 210 writes data to disk 102 (1010). Data may be written to disk 102 at any time the power of a source is being adjusted (i.e., before, during or after). In this manner, slider 116 represents an example of a slider configured to emit electromagnetic radiation, transmit the electromagnetic radiation through a waveguide onto a surface of a magnetic media, measure the resistance of photoresistive material proximately located to the waveguide and determine the intensity of electromagnetic radiation propagating through the waveguide based on the measured resistance.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A heat assisted magnetic recording slider of a disk drive, comprising:
   a transducer configured to emit electromagnetic radiation;
   a waveguide configured to transmit the electromagnetic radiation onto a surface of a magnetic media; and
   a layer of photoresistive material proximately located to the waveguide such that the resistance of the photoresistive material is proportional to the intensity of electromagnetic radiation propagating through the waveguide.

2. The slider of claim 1, wherein the layer of photoresistive material is includes a series of meandering lines.

3. The slider of claim 1, wherein the layer of photoresistive material is deposited on surfaces of optical cladding encapsulating the waveguide.

4. The slider of claim 1, wherein the layer of photoresistive material comprises a first photoresistive area proximately located to a first portion of the waveguide and a second photoresistive area proximately located to a second portion of the waveguide.

5. The slider of claim 1, wherein the waveguide includes a primary waveguide configured to transmit electromagnetic radiation onto a surface of the magnetic media and a secondary waveguide configured to receive scattered electromagnetic radiation and wherein the layer of photoresistive material directly clads the secondary wave guide.

6. The slider of claim 1, wherein the transducer emits electromagnetic radiation including a wavelength of approximately 800 nm and the layer of photoresistive material is composed of amorphous silicon.

7. The slider of claim 1, wherein the transducer emits electromagnetic radiation including a wavelength within the range of 400-700 nm and the layer of photoresistive material is composed of cadmium sulfide.

8. The slider of claim 1, wherein the transducer emits electromagnetic radiation including a wavelength within the range of 5-8 microns and the layer of photoresistive material is composed of lead sulfide or indium antimonide.

9. The slider of claim 1, wherein the transducer is a laser diode and wherein the slider further includes a laser driver configured to drive the laser diode based on a measured resistance of the layer of photoresistive material.

10. A method of monitoring electromagnetic power in a heat assisted magnetic recording slider, the method comprising:
    emitting electromagnetic radiation;
    transmitting the electromagnetic radiation through a waveguide onto a surface of a magnetic media;
    measuring the resistance of a layer of photoresistive material proximately located to the waveguide; and
    determining the intensity of electromagnetic radiation propagating through the waveguide based on the measured resistance.

11. The method of claim 10, wherein photoresistive material includes a series of meandering lines.

12. The method of claim 10, wherein the layer of photoresistive material is deposited on surfaces of optical cladding encapsulating the wave guide.

13. The method of claim 10, wherein the layer of photoresistive material comprises a first photoresistive area proximately located to a first portion of the waveguide and a second photoresistive area proximately located to a second portion of the waveguide, and wherein measuring the resistance of photoresistive material includes measuring a first resistance corresponding the first photoresistive area and a second resistance corresponding to the second photoresistive area.

14. The method of claim 10, further comprising receiving scattered electromagnetic radiation through a secondary waveguide, and measuring the resistance of photoresistive material proximately located to the secondary waveguide.

15. The method of claim 10, wherein emitting electromagnetic radiation includes emitting electromagnetic radiation having a wavelength of approximately 800 nm and wherein the layer of photoresistive material is composed of amorphous silicon.

16. The method of claim 10, wherein emitting electromagnetic radiation includes emitting electromagnetic radiation having a wavelength within the range of 400-700 nm and the layer of photoresistive material is composed of cadmium sulfide.

17. The method of claim 10, wherein emitting electromagnetic radiation includes emitting electromagnetic radiation having a wavelength within the range of 15-1000 microns and the layer of photoresistive material is composed of a germanium copper alloy.

18. The method of claim 10, wherein emitting electromagnetic radiation includes emitting electromagnetic radiation using a laser diode, and further comprising driving the laser diode based on a measured resistance of the layer photoresistive material.

19. An apparatus configured to store data using heat assisted magnetic recording, the apparatus comprising:
    means for emitting electromagnetic radiation;
    means for transmitting the electromagnetic radiation onto a surface of a magnetic media;
    means for measuring the resistance of a layer of photoresistive material proximately located to the means for transmitting; and
    means determining the intensity of electromagnetic radiation propagating through the means for transmitting based on the measured resistance.

20. The device of claim 19, means for adjusting the power of emitted electromagnetic radiation based at least in part on the measured resistance.

* * * * *